(12) United States Patent
Takefman et al.

(10) Patent No.: US 12,665,691 B1
(45) Date of Patent: Jun. 23, 2026

(54) LINK TRAINING WITH MULTIPLE HOPS

(71) Applicant: Marvell Asia Pte Ltd, Singapore (SG)

(72) Inventors: Michael Takefman, Nepean (CA);
Whay Sing Lee, Milpitas, CA (US)

(73) Assignee: Marvell Asia Pte Ltd, Singapore (SG)

( * ) Notice: Subject to any disclaimer, the term of this patent is extended or adjusted under 35 U.S.C. 154(b) by 520 days.

(21) Appl. No.: 18/134,134

(22) Filed: Apr. 13, 2023

Related U.S. Application Data

(60) Provisional application No. 63/330,367, filed on Apr. 13, 2022.

(51) Int. Cl.
H04J 3/06 (2006.01)

(52) U.S. Cl.
CPC .......... H04J 3/0673 (2013.01); H04J 3/0682 (2013.01)

(58) Field of Classification Search
CPC ...... H04J 3/0673; H04J 3/0682; H04J 3/0658; H04J 3/1694; H04W 76/10; H04W 24/06; H04W 24/08; H04W 56/001; H04W 28/0975; H04L 49/3054; H04L 43/50; H04L 43/10; H04L 7/0008; H04L 1/0002
USPC ....... 370/503, 335, 350, 236, 324, 329, 341, 370/342, 343, 227, 228, 229, 252, 253, 370/255, 353, 400; 455/67.11, 67.13, 455/67.14
See application file for complete search history.

(56) References Cited

U.S. PATENT DOCUMENTS

| | | | | |
|---|---|---|---|---|
| 8,380,912 B2 * | 2/2013 | Jaramillo | ........... | H04N 21/4367 710/313 |
| 2010/0229071 A1 * | 9/2010 | Ganga | ................... | H04L 1/0052 714/752 |
| 2011/0265139 A1 * | 10/2011 | Singh | ................. | H04N 21/6437 725/116 |
| 2021/0034317 A1 * | 2/2021 | Komiyama | ...... | H04N 21/43076 |
| 2023/0195677 A1 * | 6/2023 | Li | ........................ | G06F 13/4068 710/313 |
| 2023/0198852 A1 * | 6/2023 | Kumar | ..................... | H04B 3/46 709/220 |

OTHER PUBLICATIONS

Chen, "Home Network Basis: Transmission Environments and Wired/Wireless Protocols," Prentice Hall, 26 pages (2006).
(Continued)

*Primary Examiner* — Ricardo H Castaneyra

(57) ABSTRACT

A first intermediate network device among one or more intermediate network devices performs link training on a first network link extending between the first intermediate network device and a first host network device. The first intermediate network device or a second intermediate network device among the one or more intermediate network devices performs link training on a second network link extending between the first intermediate network device or the second intermediate network device and a second host network device. The one or more intermediate network devices determine when link training of the first network link and the second network link has been completed, and transmit respective link training completion indications to the first host network device and the second host network device. Transmission of the respective link training completion indications includes delaying transmission until link training of both the first network link and the second network link has been completed.

18 Claims, 14 Drawing Sheets

Configured to delay transmission of respective link training completion indications to the end-point network devices until link training is completed with both of the end-point network devices

(56)        References Cited

OTHER PUBLICATIONS

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 GB/s Operation The Institute of Electrical and Electronics Engineers, Inc., 540 pages (May 1, 2002).

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., 379 pages (Mar. 8, 2002).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., Sections 1-5, 2695 pages (Dec. 9, 2005).

IEEE Std 802.3ch-2020 "IEEE Standard for Ethernet—Amendment 8: Physical Layer Specifications and Management Parameters for 2.5 GB/s, 5 GB/s, and 10 GB/s Automotive Electrical Ethernet," IEEE Computer Society, pp. 1-207 (Jun. 30, 2020).

IEEE Std. 802.3bpTM-2016, "IEEE Standard for Ethernet—Amendment 4: Physical Layer Specifications and Management Parameters for 1Gb/s Operation over a Single Twisted Pair Copper Cable," The Institute of Electrical and Electronics Engineers, Inc., 211 pages (Jun. 30, 2016).

IEEE Std. 802.3bpTM/D1.5, "Draft Standard for Ethernet Amendment: Physical Layer Specifications and Management Parameters for 1Gb/s Operation over a Single Twisted Pair Copper Cable," The Institute of Electrical and Electronics Engineers, Inc., 202 pages (Jun. 14, 2015).

U.S. Appl. No. 18/142,574, Whay Sing Lee et al., "Improving Interoperability of Communication Devices," filed May 2, 2023.

* cited by examiner

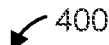

400

Perform, by a first intermediate network device
among one or more intermediate network devices,
link training on a first network link, the first network
link extending between the first intermediate
network device and a first host network device
402

Perform, by the first intermediate network device
or by a second intermediate network device
among the one or more intermediate network
devices, link training on a second network link, the
second network link extending between either the
first intermediate network device or the second
intermediate network device and a second host
network device
404

Determine, by the one or more intermediate
network devices, when link training of the first
network link and the second network link has been
completed
406

Transmit, by the one or more intermediate network
devices, respective link training completion
indications to the first host network device and to
the second host network device, including delaying
transmission of the respective link training
completion indications until link training of both the
first network link and the second network link has
been completed
408

*FIG. 4*

LINK TRAINING WITH MULTIPLE HOPS

CROSS REFERENCES TO RELATED APPLICATIONS

This application claims the benefit of U.S. Provisional Patent Application No. 63/330,367, entitled "Extending 802.3 Auto Negotiation Link Training (ANTL) for Multiple Hops for Use in Active Electrical/Copper Cables and Systems," filed on Apr. 13, 2022, the disclosure of which is hereby expressly incorporated herein by reference in its entirety.

FIELD OF TECHNOLOGY

The present disclosure relates generally to network interface devices connected over multiple hops, and more particularly to link training between network devices over multiple hops.

BACKGROUND

Network devices, such as Ethernet network devices, typically perform auto negotiation and/or link training when establishing a link between the network devices. During auto negotiation between two network devices, the network devices exchange information about capabilities of the network devices and select common communication parameters, such as a common transmission speed, supported by both network devices. Link training, on the other hand, involves exchange of training signals between the network devices to allow the network devices to adjust to frequency of incoming data and to optimize receiver and/or transmitter parameters, such as filter or equalizer coefficients, to account for a frequency response of the network link between the network devices.

Recently, intermediate network devices, such as retimer or gearbox devices, have been used to improve signal quality in communication between host network devices. For example, an active copper cable (ACC) may be used to connect two host network devices. An ACC typically includes one or more intermediate network devices that are positioned between the two host network devices and are interconnected with passive cable links between the intermediate devices and the host network devices. In such systems, link-up processes such as auto negotiation and link training need to be performed over multiple hops between the host network devices. The current communication protocol, such as the IEEE 802.3 standard, generally define link-up processes in the context of a single hop between two network devices, and do not extend to multi-hop auto-negotiation and link training between network devices. Moreover, the current IEEE 802.3 Standard stipulates strict timing requirements that make it more difficult to perform link training over multiple hops between host network devices. The timing problem is further exacerbated when clock synchronization needs to be performed to synchronize transmit clocks of the intermediate network devices with transmit clocks of the host network devices. Thus, in current systems with intermediate network devices, the link-up process often cannot be performed in the time allotted by the current standard and the training phase of the link-up process is restarted, resulting in longer link-up times or complete failures to establish a link between two host network devices.

SUMMARY

In an embodiment, a method for performing link training over a plurality of hops between host network devices includes: performing, by a first intermediate network device among one or more intermediate network devices, link training on a first network link, the first network link extending between the first intermediate network device and a first host network device; performing, by the first intermediate network device or by a second intermediate network device among the one or more intermediate network devices, link training on a second network link, the second network link extending between either the first intermediate network device or the second intermediate network device and a second host network device; determining, by the one or more intermediate network devices, when link training of the first network link and the second network link has been completed; and transmitting, by the one or more intermediate network devices, respective link training completion indications to the first host network device and to the second host network device, including delaying transmission of the respective link training completion indications until link training of both the first network link and the second network link has been completed.

In another embodiment, an active cable assembly comprises one or more intermediate network devices, wherein a respective intermediate network device among the one or more intermediate network devices includes i) a first interface configured to couple with a first host network device directly or via one or more upstream intermediate network devices and i) a second interface configured to couple with a second host network device directly or via one or more downstream intermediate network devices, and one or more link training controllers implemented by the one or more intermediate network devices. The one or more link training controllers are configured to: perform link training on a first network link, the first network link extending between a first intermediate network device and a first host network device, perform link training on a second network link, the second network link extending between either the first intermediate network device or a second intermediate network device and a second host network device, determine when link training of the first network link and the second network link has been completed, and transmit respective link training completion indications to the first host network device and to the second host network device, the one or more link training controllers configured to delay transmission of the respective link training completion indications until link training of both the first network link and the second network link has been completed.

BRIEF DESCRIPTION OF THE DRAWINGS

FIG. 4 is a flow diagram of an example method for receiving and implementing software and/or firmware updates transmitted to a first network interface device from a second network interface device over a network link during a link establishment process for establishing the network link, according to an embodiment.

DETAILED DESCRIPTION

Figure 1:
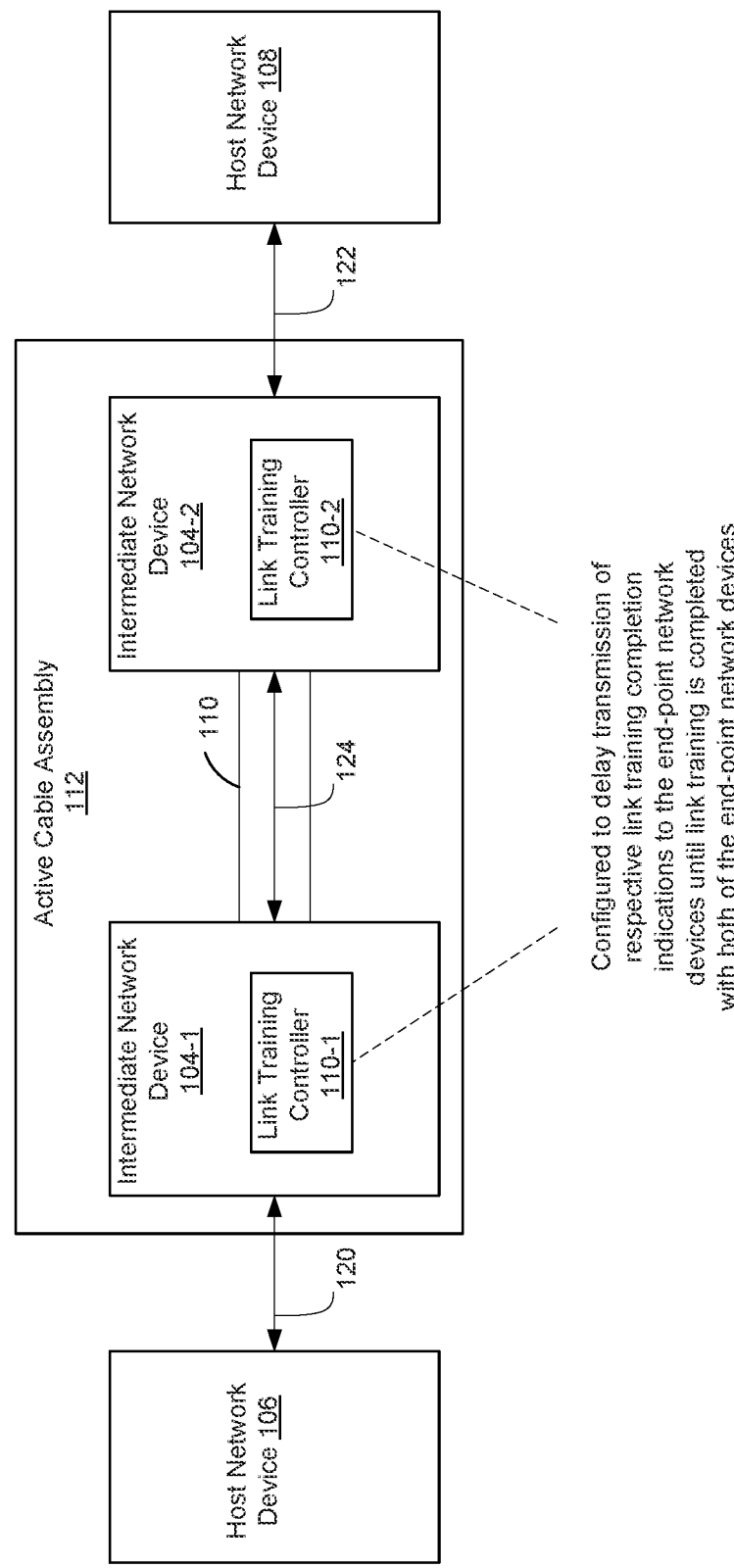
FIG. 1 is a simplified diagram of an example system that includes host network devices connected via one or more intermediate network devices over multiple hops, according to an embodiment.

As discussed above, in some network systems, link training needs to be performed between two host network devices over multiple hops. For example, the two host network devices may be connected to each other via one or more intermediate network devices, such as one or more retimer devices. The one or more intermediate network devices may be assembled in an active copper cable (ACC) and may be configured to improve performance of the copper cable, for example. In at least some such systems, before communication can occur between the host network devices, link training needs to be performed over multiple network links formed between the host network devices and the one or more intermediate network devices. However, as also discussed above, current communication protocols, such as the IEEE 802.3 standard, define link training only in the context of a single network link between host network devices. Moreover, the current communication protocols, such as the IEEE 802.3 standard, stipulate a relatively short amount of time from a time at which link training on a network link between a first network device and a second network device is completed to a time at which data is to be received at the first network device from the second network device. Generally, link training in accordance with the current communication protocols involves transmission of training signals from a first network device to a second network device to allow the second network device to train the network link for reception of data from the first network device. Once link training is completed by the second network device, the second network device transmits an indication of link training completion to the first network device. Upon receiving the link training completion indication from the second network device, the first network device enters a data mode and expects to receive data from the second network device within the stipulated period of time. According to the IEEE 802.3 standard, if data is not received at the first network device from the second network device within the stipulated period of time, then link training between the first network device and the second network is restarted.

Because link training in a multi-hop system involves training of multiple links between two host network devices, link training at a first host network device may be completed before link training at a second host network device. Thus, the first host network device may be ready to receive data from the second host network device before the second host network is ready to transmit data to the first host network device. However, as discussed above, if data is not received within a stipulated time period after completion of link training at the first network device, link-training is restarted at the first network device. As a result, it is difficult or impossible to successfully complete link training involving multiple hops in accordance with the current communication standards.

In embodiments described below, one or more intermediate network devices between a first host network device and a second host network device are configured to delay transmission of respective link training completion indications to the first host network device and the second host network device until link training of network links respectively coupled to the first host network device and to the second host network device has been completed. Because the one or more intermediate network devices are configured to delay transmission of respective link training completion indications until link training of the network links respectively coupled to the first host network device and to the second host network device has been completed, the host network devices receive the respective indications at approximately the same time. Thus, data transmission between the host network devices can begin within the period of time stipulated by a current communication protocol, such as the IEEE 802.3 standard. Accordingly, delaying transmission of respective link training completion indications until link training of links respectively coupled to the first host network device and to the second host network device has been completed allows for the multi-hop link training to be performed between two host network devices configured in accordance with the current communication standard and without changing firmware of the host network devices, in at least some embodiments.

FIG. 1 is a simplified diagram of an example system 100 that includes one or more intermediate network devices 104 coupled between a first host network device 106 and a second host network device 108. The one or more intermediate network devices include a first intermediate network device 104-1 and a second intermediate network device 104-2 interconnected by a passive cable 110, in the illustrated embodiment. The passive cable 110 comprises a copper cable or another passive connection, in various embodiments. The intermediate network device 104-1, the intermediate network device 104-2 and the passive cable 110 are assembled together in an active copper cable (ACC) assembly 112, for example. Although the system 100 is illustrated in FIG. 1 as including two intermediate network devices 104 coupled in series between the first host network device 106 and the second host network device 108, the system 100 includes another suitable number (e.g., 3, 4, 5, etc.) of intermediate network devices 104 coupled in series between the first host network device 106 and the second host network device 108, in other embodiments. Further, although the intermediate network devices are 104 are illustrated in FIG. 1 as being parts of an active cable assembly 110, the intermediate network devices 104 are intermediate network devices used in systems other than active cable assemblies, in some embodiments. In another embodiment, the system 100 includes only a single intermediate network device 104 coupled between the first host network device 106 and the second host network device 108.

In various embodiments, each of the first host network device 106 and the second host network device 108 comprises a network switch, a network router, a network bridge, or another suitable network device configured to switch of route network traffic on a network, such as an Ethernet network. The one or more intermediate network device 104 are generally configured to receive signals transmitted by the host network devices 106, 108 over network links, process the signals, for example to improve signal quality, and re-transmit the signals to the host network devices 106, 108 on other network links. In an embodiment, a respective intermediate network device 104 includes a first network interface, such as a first serializer deserializer (SERDES) interface, and a second network interface, such as a second SERDES interfaces. The intermediate network device 104 is configured to receive signals via the first network interface, process the signals, and re-transmit the signals over the second network interface. Similarly, the intermediate network device 104 is configured to receive signals via the second network interface, process the signals, and re-transmit the signals over the first network interface, in an embodiment. In various embodiments, each of the one or more network device 104 comprises one or more of i) a retimer device configured to extract a clock from a received signal, recover data from the received, and regenerate the data with a clean clock, ii) a gearbox device configured to merge N slower speed signals at speed M into a signal stream at speed M*N or reverse the merge function by separating slower speed signals from a received single stream, iii) a coder device configured to add, regenerate or transcode forward error correction (FEC) coded data, and iv) a devices that implements a full physical coding sublayer (PCS) of an Ethernet communication protocol, such as the IEEE 802.3 communication standard.

The first intermediate network device 104-1 is coupled to the first host network device 108 via a first network link 120. The second intermediate network device is coupled to the second host network device via a second network link 122. The first intermediate network device 104-1 is coupled to the second intermediate network device 104-2 via a network link 124. Although the first network link 120 is illustrated in FIG. 1 as a single network link for the purpose of simplicity, the network link 120 includes a network link from the first intermediate network device 120 to the first host network device 106 and a second network link from the first host network device 106 to the first intermediate network device 104-1, in an embodiment. Similarly, although the second network link 122 is illustrated in FIG. 1 as a single network link for the purpose of simplicity, the second network link 112 includes a network link from the second intermediate network device 104-2 to the second host network device 108 and a second network link from the second host network device 108 to the second intermediate network device 104-2, in an embodiment. Similarly, although the third network link 124 is illustrated in FIG. 1 as a single network link for the purpose of simplicity, the third network link 124 includes a network link from the first intermediate network device 104-2 to the second intermediate network device 104-2 and a second network link from the second intermediate network device 104-2 to the first intermediate network device 104-1, in an embodiment.

In an embodiment, in order to establish communication over a communication channel from the first host network device 106 to the second host network device, link training is performed to train a first network link from the first host network device 106 to the first intermediate network device 104-1, a second network link from the first intermediate network device 104-1 to the first intermediate network device 104-2, and a third network link from the second intermediate network device 104-2 to the second host network device 108. Similarly, in order to establish communication over the communication channel from the second host network device 108 to the first host network device 106, link training is performed to train a first network link from the second host network device 108 to the second network intermediate network device 104-2, a second network link from the second intermediate network device 104-2 to the first intermediate network device 104-1, and a third network link from the first intermediate network device 104-1 to the first host network device 106. In at least some embodiments, link training of network links of the communication channels between the first host network device 106 and the second host network device 108 also includes synchronization of clocks of the first intermediate network device 104-1 and the second intermediate network device 104-2 such that transmit clocks are synchronized with receive clocks at the first intermediate network device 104-1 and the second intermediate network device 104-2.

The first host network device 106 and the second host network device 108 are configured to perform link training in accordance with a communication protocol, such as the IEEE 802.3 communication standard. In an embodiment, the communication protocol stipulates a link-up time requirement according to which the first host network device 106 and the second host network device 108 expect to receive data transmitted over a network link within a certain amount of time after completion of the network link. The first intermediate network device 104-1 and the second intermediate network device 104-2 include respective link training controllers 110-1, 110-2. The respective link training controllers 110-1, 110-2 are generally configured to generally perform link training in accordance with the communication protocol, such as the IEEE 802.3 standard, but are modified to ensure that transmission of data between the first host network device 106 and the second host network device 108 to begin within the stipulated amount of time after completion of link training of the multiple network links between the first host network device 106 and the second host network device 108, in an embodiment. In an embodiment, the respective link training controllers 110-1, 110-2 are configured to delay transmission of respective link training completion indications to the first host network device 106 and the second network device 108 until link training is completed on each network link in the communication channel between the first host network device 106 and the second network device 108, and the transmit clocks are synchronized with receive clocks at the first intermediate network device 104-1 and the second intermediate network device 104-2.

In various embodiments, because the respective link training controllers 110-1, 110-2 are configured to delay transmission of respective notifications of link training completion to the first host network device 106 and the second network device 108 until link training is completed on each network link in the communication channel between the first host network device 106 and the second network device 108 and the transmit clocks are synchronized with receive clocks at the first intermediate network device 104-1 and the second intermediate network device 104-2, the first host network device 106 and the second host network device 108 receive the respective notifications of link training completion at the same time or at least approximately same time. As a result, transmission of data between the first host network device 106 and the second host network device 108 can occur in a timely manner to satisfy the link-up time requirement stipulated by the communication protocol, such as the IEEE 802.3 communication standard.

In an embodiment, the link training controllers 110-1, 110-2 are configured to perform link training such that the network links between the first intermediate network device 104-1 and the second intermediate network device 104-2 are trained prior to initiation of link training of network links between the intermediate network devices 104-1, 104-2 and the host network device 106, 108. In an embodiment, when training of the network links network links between the first intermediate network device 104-1 and the second intermediate network device 104-2 is completed, training of the network links between i) the first intermediate network device 104-1 and the first host network device 106 and ii) the second intermediate network device 104-2 and the second host network device 108, is concurrently performed. In an embodiment, when training between the first intermediate network device 106-1 and the second intermediate network device 104-2 is completed, the link training controllers 110 transmit pseudorandom data to each other to ensure that the lock between the first intermediate network device 104-1 and the second intermediate network device 104-2 is not lost while link training between i) the first intermediate network device 104-1 and the first host network device 106 and ii) the second intermediate network device 104-2 and the second host network device 108 is being performed. Further, in some embodiments, the first intermediate network device 104-1 and the second intermediate network device 104-2 adjust clocks based on training signals received from the host network devices 106, 108 and lock transmitter clocks to receiver clocks at each of the first intermediate network device 104-1 and the second intermediate network device 104-2. In an embodiment, as described in more detail below, suitably slow clock adjustment is performed in order to adjust the clocks without losing a lock between the first intermediate network device 104-1 and the second intermediate network device 104-2, in an embodiment.

According to an embodiment, the respective link training controllers 110-1, 110-2 are configured to exchange completion notifications when link training and clock synchronization is completed at the first intermediate network device 104-1 and the second intermediate network device 104-2. After exchange of the completion notifications between the link training controllers 110-1, 110-2, the respective link training controllers 110-1, 110-2 transit link training completion notifications to the first host network device 106 and the second host network device 108 at the same time or at least approximate same time, allowing for transmission of data between the first host network device 106 and the second host network device 108 to begin within the link-up time specified by the communication protocol, in an embodiment.

In some embodiments, prior to performing link training, the intermediate network devices 104 perform auto nego-tiation to select a transmission speed to be used for communication between the first host network device 106 and the second host network device 108. Auto-negotiation is initiated upon power-up of the host network devices 106, 108 and the intermediate network devices 104, for example. In an embodiment, auto-negotiation includes exchange of transmission speeds supported by the intermediate network devices 104-1, 104-2, and transmission speeds supported by the host network devices 106, 108, and selection of a highest common transmission speed supported by each of the intermediate network devices 104-1, 104-2 and the host network devices 106, 108. In an embodiment, auto-negotiation includes the first host network device 106 and the second host network device 108 advertising transmission speeds supported by the first host network device 106 and the second host network device 108. The first intermediate network device 104-1 is configured to receive, from the first host network device 106, advertised transmission speeds supported the first host network device 106 and to forward the transmission speeds supported by the first host network device 106 to the second intermediate network device 104-2. Similarly, the second intermediate network device 104-2 is configured to receive, from the second host network device 108, advertised transmission speeds supported the second host network device 108 and to forward the transmission speeds supported by the second host network device 108 to the first intermediate network device 104-1. Upon selection of the highest common transmission speed supported by each of the intermediate network devices 104-1, 104-2 and the host network devices 106, 108, the intermediate network devices 104-1, 104-2 notify the host network devices 106, 108, of the selected transmission speeds, in an embodiment. In other embodiments, auto-negotiation need not be performed and is omitted. For example, the intermediate network devices 104-1, 104-2 notify the host network devices 106, 108 are pre-configured to use a common highest transmission speed supported by the intermediate network devices 104-1, 104-2, and transmission speeds supported by the host network devices 106, 108, in some embodiments.

Figure 2:
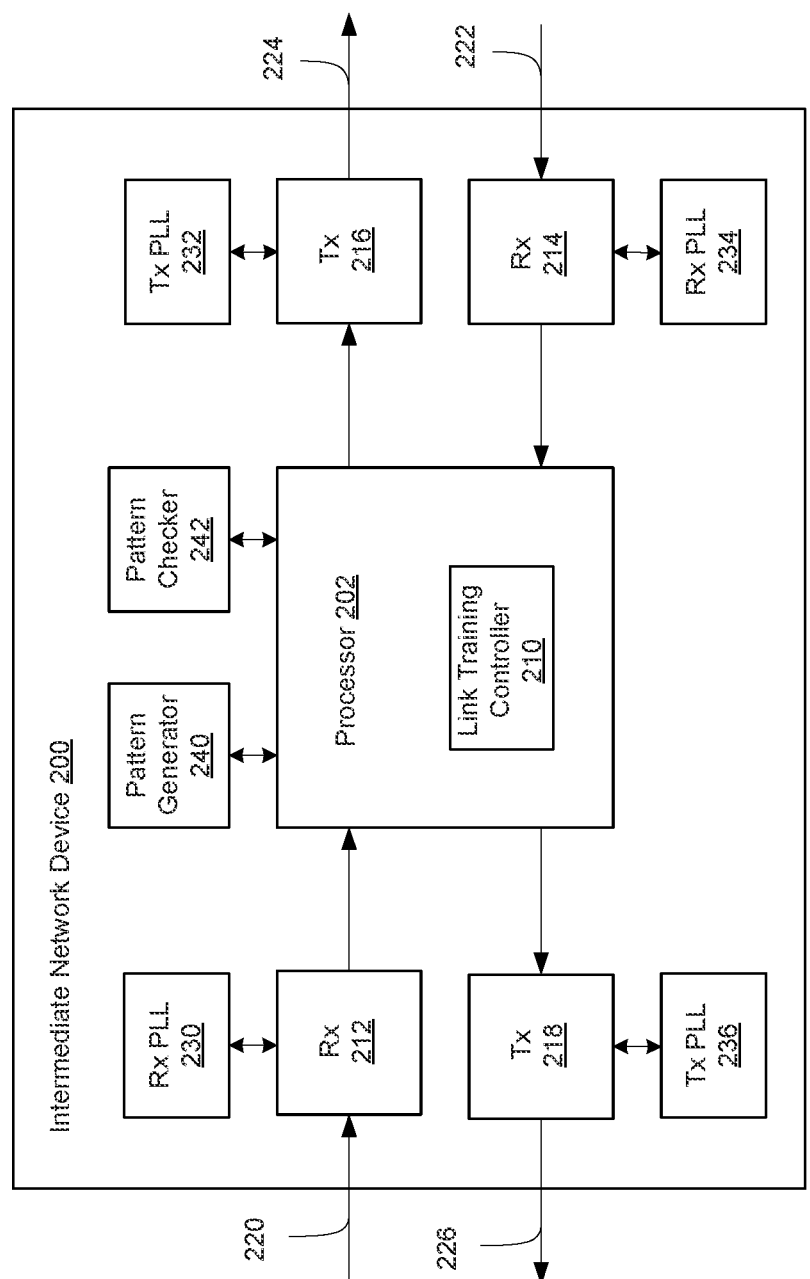
FIG. 2 is a block diagram of an example intermediate network utilized as an intermediate network device in the system of FIG. 1, according to an embodiment.

FIG. 2 is a block diagram of an example intermediate network device 200, according to an embodiment. The intermediate network device 200 is utilized as an interme-diate network device 104 in the system 100 of FIG. 1, in an embodiment. For example, each of the first intermediate network device 104-1 and the second intermediate network device 104-2 of the system 100 of FIG. 1 corresponds to the intermediate network device 200, in an embodiment. In another embodiment, the intermediate network device 200 is utilized in a system different from the system 100 of FIG. 1. Similarly, the first intermediate network device 104-1 and/or the second intermediate network device 104-2 is different from the intermediate network device 200, in some embodi-ments.

The intermediate network device 200 includes a processor 202 coupled to a plurality of network interfaces including a first receiver interface 212, a second receiver interface 214, a first transmitter interface 216, and a second transmitter interface 218. The first receiver interface 212 and the second receiver interface 214 are configured to receive signals from, respectively, network links 220, 222 and to provide the signals to the processor 202. The first transmitter interface 216 and the second transmitter interface 218 are configured to receive signals from the processor 202 and to transmit the signals via, respectively, network links 224, 226. The pro-cessor 202 is configured to process signals received from the first receiver interface 212 and second receiver interface 214 and to generate signals for transmission by the first trans-mitter interface 216 and the second transmitter interface 218. The processor 202 is configured to implement functions of sublayers of a physical layer of a communication protocol, such as an Ethernet communication protocol (e.g., defined by the IEEE 802.3 communication standard). For example, the processor 202 is configured to implement at least the physical medium attachment (PMA) sublayer and the physi-cal medium dependent (PMD) sublayer of the PHY layer of the communication protocol. In an embodiment, the proces-sor 202 is also configured to implement a physical coding sublayer (PCS) of the PHY layer of the communication protocol. In another embodiment, the processor 202 is not configured to implement a physical coding sublayer (PCS) of the PHY layer of the communication protocol. The processor 202 is not configured to implement a medium access layer (MAC) of the communication protocol, in an embodiment.

For example, the processor 202 is configured to receive a signal from the receiver interface 212, recover a clock from a signal, recover data from the signal, re-generate the signal with a clean clock, and provide the re-generated signal to the transmitter interface 216 for transmission via the network link 224. As another example, the processor 202 is also configured to receive a signal from the receiver interface 214, recover a clock from a signal, recover data from the signal, re-generate the signal with a clean clock, and provide the re-generated signal to the transmitter interface 218 for transmission via the network link 226. In some embodi-ments, the processor 202 is configured to perform further processing of the signal. For example, the processor 202 is configured to add, regenerate and/or transcode forward error correction (FEC) coded data recovered from the signal. In some embodiments in which the processor 202 is configured to implement the PCS sublayer, the processor 202 is con-figured to implement rate adaptation, such as rate adaption by insertion and deletion of idle characters in the signal.

The processor 202 includes a link training controller 210, in an embodiment. The link training controller 210 is configured to control operation of the intermediate network device 200 during link training of the network links 220, 224, 226, 222, as described herein, in various embodiments.

For example, the link training controller 210 is configured to delay transmission of link training completion indications as described herein, in various embodiments. In some embodiments, the link training controller 210 is also configured to control operation of the intermediate network device 200 during auto-negotiation performed by the intermediate network device 200. Accordingly, although the link training controller 210 is illustrated in FIG. 2 as being a link training controller, the link training controller 210 is an AN/LT controller that comprises both an auto-negotiation controller and a link training controller, in some embodiments.

The intermediate network device 200 also includes a plurality of clocks, including a first receive clock 230, a first transmit lock 232, a second receive clock 234 and a second transmit clock 236. The intermediate network device 200 is configured to adjust the plurality clocks during link training to lock transmit clocks of the intermediate network device 200 with transmit clocks of host network devices coupled directly to the intermediate network device 200, or coupled to the intermediate network device 200 via one or more other intermediate network devices, in an embodiment. Each of the plurality of clocks is maintained by a phase locked loop (PLL), in an embodiment. In another embodiment, the intermediate network device 200 is configured to maintain one or more of the clocks 230, 232, 234, 236 using a suitable controller other than a PLL, or in addition to a PLL. For example, the intermediate network device 200 is configured to maintain the transmit clocks 216, 218 using a frequency locked loop (FLL). In an embodiment, an FLL comprises an external digital controller of an analog phase locked loop (PLL). The external digital controller is implemented by, or otherwise included in, the processor 202 and/or the link training controller 210, in an embodiment. The digital controller is configured to control the speed of adjustment of the PLL, in an embodiment. For example, the digital controller is configured to control the PLL to slowly adjust the frequency of the clock to track the frequency of a clock embedded in a received signal. As described in more detail below, maintaining transmit clocks using an FLL or other suitable controller configured to control speed of frequency adjustment of a clock allows the intermediate network device 200 to adjust the clocks sufficiently slowly such that the clocks are adjusted without losing a lock between intermediate network devices, in some embodiment.

With continued reference to FIG. 2, the intermediate network device 200 also includes a pattern generator 240 and a pattern checker 224. The pattern generator 240 is configured to generate various predetermined pseudorandom binary sequences (PRBS) for transmission by the intermediate network device 200, in an embodiment. The pattern checker 242 is configured to detect which predetermined PRBS is being received by the intermediate network device 200. As described in more detail below, transmission and reception of various PRBS signals is used by network devices to signal completion of various stages of a link-up process between host network devices, in various embodiments.

FIGS. 3A-3K are diagrams illustrating a link-up process in a system 300 that includes a pair of host network devices that are coupled to each other by communication links that include multiple hops, according to an embodiment. The system 300 is similar to the system 100 of FIG. 1 and includes like-numbered components with the system 100 of FIG. 1 that are not described in detail again for the purpose of conciseness. Similar to the system 100 of FIG. 1, the system 300 includes a first intermediate network device 304-1 and a second intermediate network device 304-2 coupled between a first host network device 306 and a second host network device 308. Each of the first intermediate network device 304-2 and the second intermediate network device 304-2 corresponds to the intermediate network device 200 of FIG. 2, in an embodiment. In another embodiment, the first intermediate network device 304-2 and/or the second intermediate network device 304-2 is an intermediate network device different from the intermediate network device 200 of FIG. 2.

The first host network device 306 is configured to transmit data to the second host network device 308 over a communication channel that includes a first network link 312 from the first host network device 306 to the first intermediate network device 304-1, a second network link 314 from the first intermediate network device 304-1 to the second intermediate network device 304-2, and a third network link 316 from the second intermediate network device 304-2 to the second host network device 308. Similarly, the second host network device 308 is configured to transmit data to the first host network device 306 over a communication channel that includes a first network link 322 from the second host network device 308 to the second intermediate network device 304-2, a second network link 324 from the second intermediate network device 304-2 to the first intermediate network device 304-1, and a third network link 326 from the first intermediate network device 304-1 to the first host network device 306. FIGS. 3A-3K depict sequential stages of the link-up process performed in the system 300 from a time at which the intermediate network devices 304-1, 304-2 and the host network devices 306, 308 are powered-on, for example, according to an embodiment.

In an embodiment, the first intermediate network device 304-1 includes a first transmit clock 332 and a second transmit clock 334. The first intermediate network device 304-1 is generally configured to transmit over the network link 314 to the second intermediate network device 304-2 using the first transmit clock 332, and is generally configured to transmit over the network link 326 to the first host network device 306 using the second transmit clock 334. The second intermediate network device 304-2 includes a first transmit clock 336 and a second transmit clock 338. The second intermediate network device 304-2 is generally configured to transmit over the network link 316 to the second host network device 308 using the first transmit clock 336, and is generally configured to transmit over the network link 324 to the first intermediate network device 304-1 using the second transmit clock 338. The first host network device 306 includes a transmit clock 342. The first host network device 306 is generally configured to transmit over the network link 312 to the first intermediate network device 304-1 using the transmit clock 324. The second host network device 308 includes a transmit clock 344. The second host network device 308 is generally configured to transmit over the network link 322 to the second intermediate network device 304-2 using the transmit clock 344. In FIGS. 3A-3K, reference clock frequencies to which each respective transmit clock at each network device is locked at the different times during the link-up process, according to an embodiment, is depicted above the corresponding transmit clock.

Figure 3A:
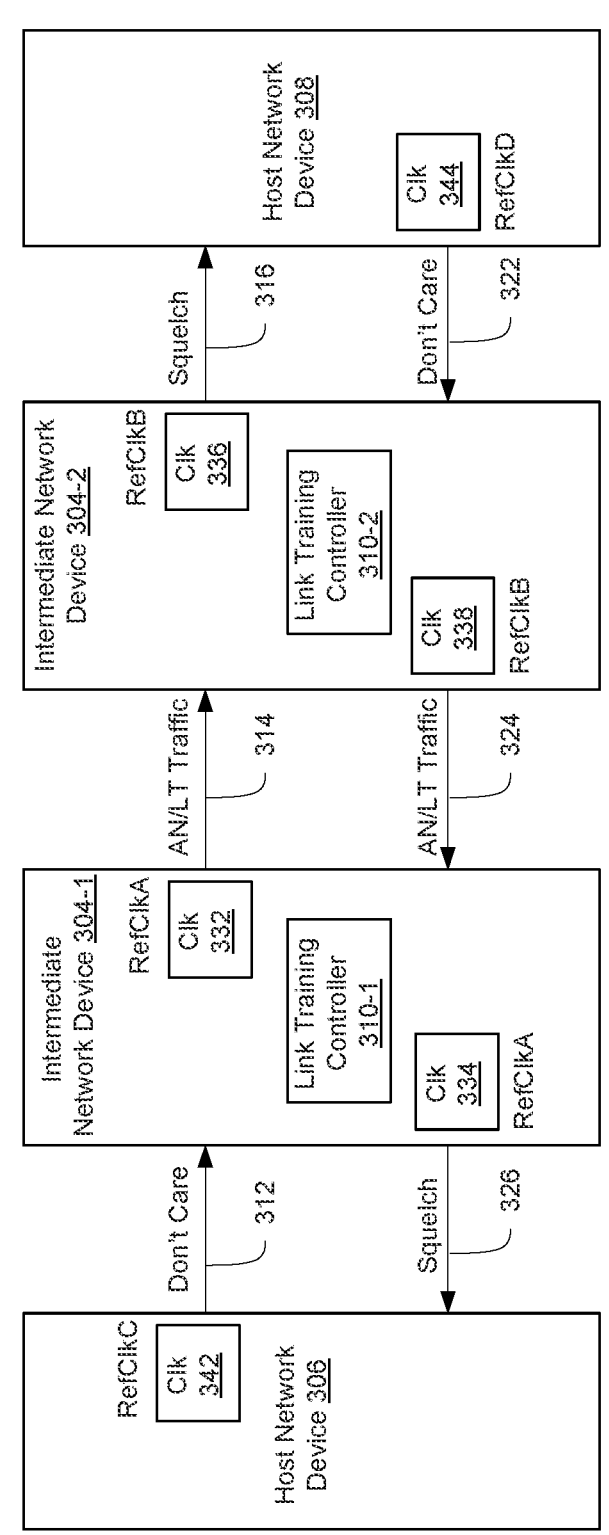
FIGS. 3A-3K are diagrams illustrating a link-up process for establishing a communication link over multiple hops, according to an embodiment.

Referring first to FIG. 3A, at a time $T_0$, the link training controllers 310-1, 310-2 perform line-side auto-negotiation over the network links 314, 324 between the first intermediate network device 304-1 and the second intermediate network device 304-2. Auto-negotiation between the first intermediate network device 304-1 and the second intermediate network device 304-2 includes exchange of supported transmission speeds by the first intermediate network device 304-1 and the second intermediate network device 304-2 on each of the network links 314, 324, and selection of a highest common supported transmission for each of the network links 314, 324, in an embodiment. At a time $T_1$, when line-side auto-negotiation between the first intermediate network device 304-1 and the second intermediate network device 304-2 is completed, the link training controllers 310-1, 312-2 begin line-side link training of the network links 314, 324 using training signals transmitted at the selected transmission speeds, in an embodiment. In some embodiments, for example if the first intermediate network device 304-1 and the second intermediate network device 304-2 are pre-configured to communicate using particular transmission speeds, auto-negotiation is omitted, and link training is performed at the pre-configured transmission speeds.

In an embodiment, the link training controllers 310-1, 310-2 are configured to, during the line-side auto-negotiation and link training between the first intermediate network device 304-1 and the second intermediate network device 304-2 at times $T_0$ and $T_1$, suppress or otherwise not perform host side auto-negotiation and/or link training with, respectively, the first host network device 306 and the second host network device 308. For example, the link training controller 310-1 is configured to, during the line-side auto-negotiation and link training between the first intermediate network device 304-1 and the second intermediate network device 304-2 at times $T_0$ and $T_1$, suppress transmission of auto-negotiation and/or training signals to the first host network device 306 and/or ignore auto-negotiation and/or training signals received from the first host network device 306, in an embodiment. Similarly, the link training controller 310-2 is configured to, during the line-side auto-negotiation and link training between the first intermediate network device 304-1 and the second intermediate network device 304-2 at times $T_0$ and $T_1$, suppress transmission of auto-negotiation and/or training signals to the second host network device 308 and/or ignore auto-negotiation and/or training signals received from the first host network device 308, in an embodiment.

With continued reference to FIG. 3A, at the times $T_0$ and $T_1$, the transmit clocks 332, 334 of the first intermediate network device are locked to a reference clock frequency A (RefClkA), and the transmit clocks 336, 338 of the second intermediate network device are locked to a reference clock frequency B (RefClkB). The transmit clock 342 of the first host network device 306 is locked to a reference clock frequency C (RefClkC). The transmit clock 344 of the second host network device 308 is locked to a reference clock frequency D (RefClkD). The transmit clocks 342, 332, 336 used for transmission over respective communication links 312, 314, 316 of the communication channel from the first host network device 306 to the second host network device 308 are not synchronized with each other at the times T0 and T1, in an embodiment. Similarly, the transmit clocks 344, 338, 334 used for transmission over respective network links 322, 324, 326 of the communication channel from the second host network device 308 to the first host network device 306 are not synchronized with each other at the times T0 and T1, in an embodiment.

Figure 3B:
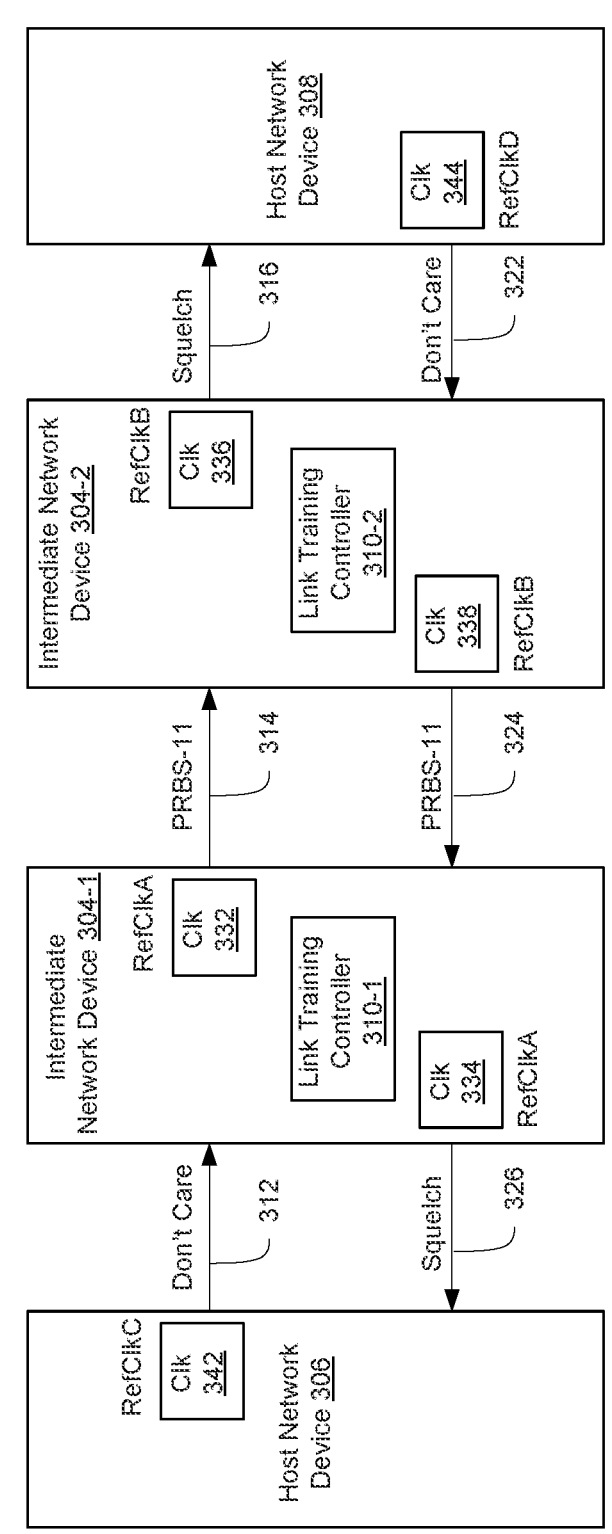

Referring now to FIG. 3B, at a time $T_2$, link training of the network links 314, 324 is completed at the intermediate network devices 304-1, 304-2. The link training controllers 310-1, 312-2 are configured to signal completion of link training to each other by transmission of a particular PRBS over the network links 312, 314, in an embodiment. For example, each of the link training controllers 310-1, 312-2 is configured to begin transmission of a particular first predetermined PRBS, such as PRBS-11, over a network link 312, 314 when link training of the network link 312, 314 is completed at the intermediate network device 304-1, 304-2. Each of the link training controllers 310-1, 312-2 is configured to receive the particular first predetermined PRBS, such as PRBS-11, over a network link 312, 314, and determine, based on receiving the particular PRBS, that link training of the network link 312, 314 is completed at the other one of the intermediate network devices 304-1, 304-2.

Figure 3C:
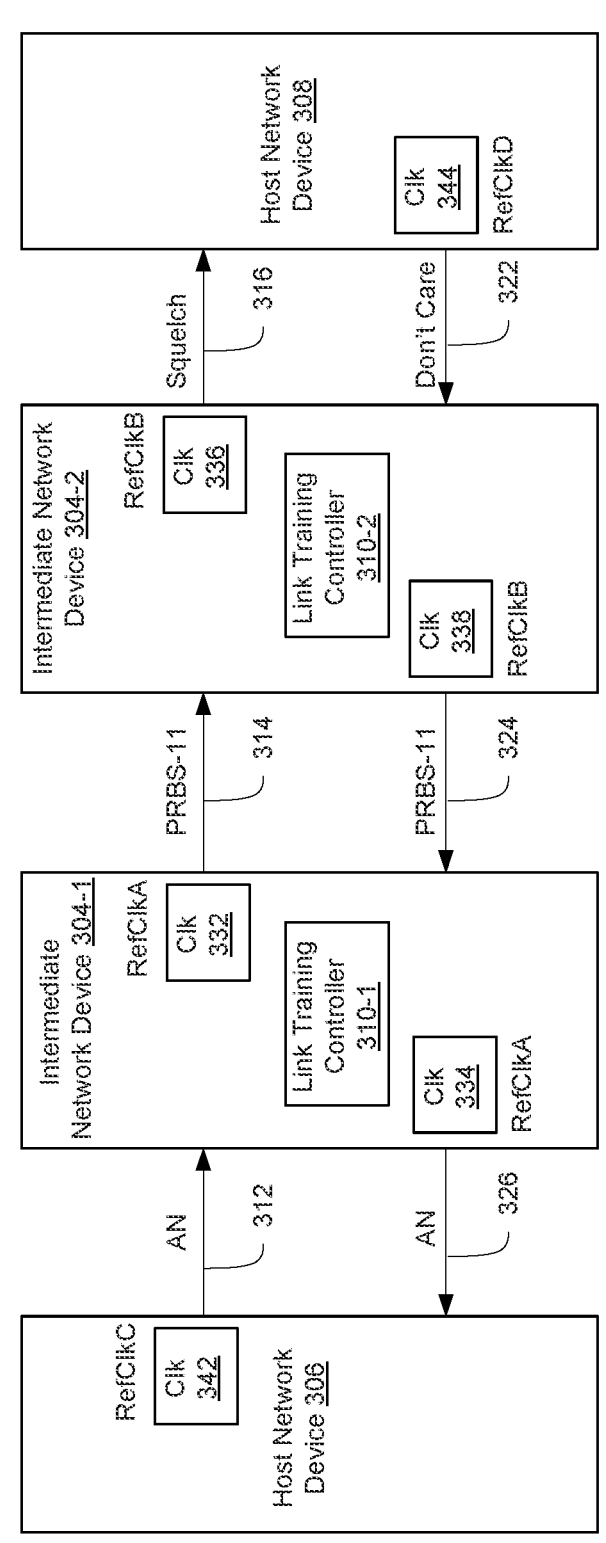
Figure 3D:
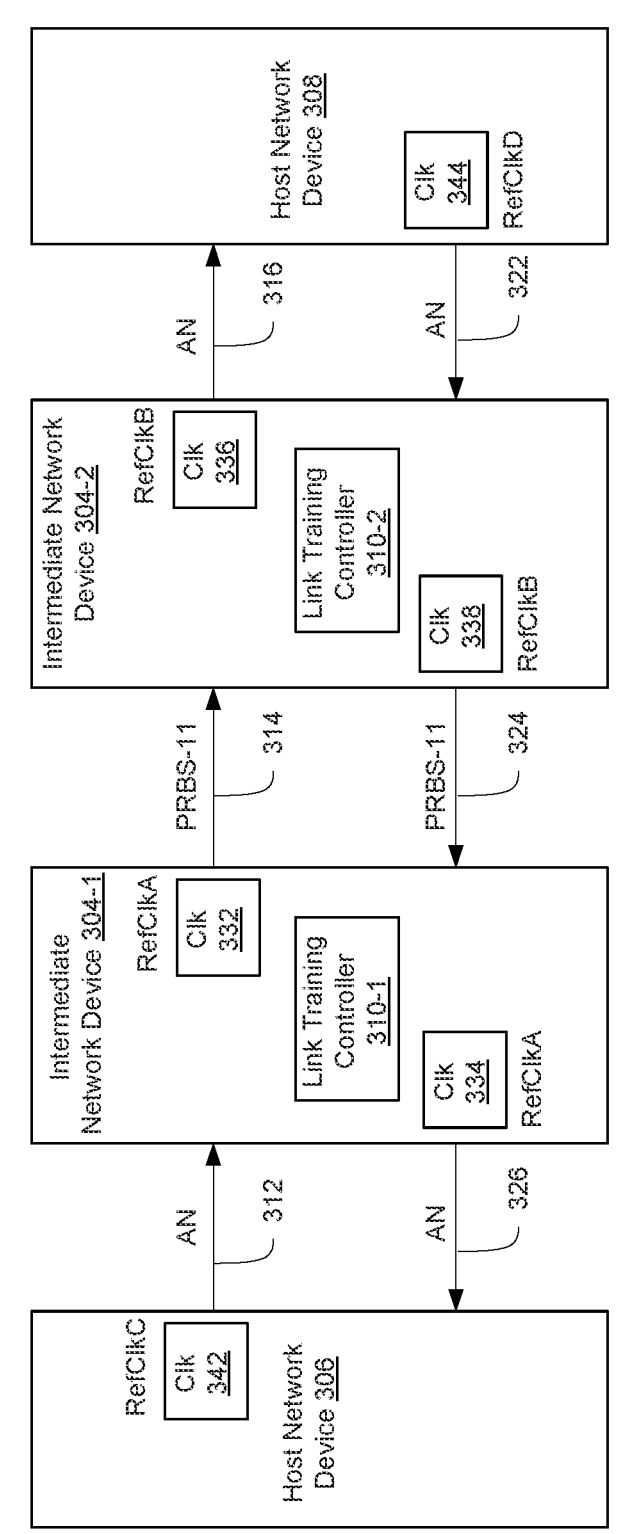

Referring now to FIG. 3C, at a time $T_{3a}$, the link training controller 310-1 initiates host-side auto-negotiation between the first intermediate network device 304-1 and the first host network device 306. In an embodiment, time $T_{3a}$ corresponds to a time at which the first intermediate network device has transmitted the particular first predetermined PRBS indicating completion of link training to the second intermediate network device 304-2 and has received the particular first predetermined PRBS indicating completion of link training from the second intermediate network device 304-2. Referring to FIG. 3D, at a time $T_{3b}$, the second intermediate network device 304-1 initiates host-side auto-negotiation between the second intermediate network device 304-2 and the second host network device 308. In an embodiment, time $T_{3b}$ corresponds to a time at which the second intermediate network device has transmitted the particular first predetermined PRBS indicating completion of link training to the first intermediate network device 304-1 and has received the particular first predetermined PRBS indicating completion of link training from the first intermediate network device 304-1. The time $T_{3a}$ and the time $T_{3b}$ at which the respective first intermediate network device 304-1 and the second intermediate network device 304-2 begin host side auto-negotiation are at least approximately equal, or are different, in various embodiments. Generally, each of the intermediate network devices 304-1, 304-2 is configured to begin host-side auto-negotiation upon detecting the particular first predetermined PRBS indicating completion of link training received from the other intermediate network device 304, which does not necessarily happen at the same time at the intermediate network devices 304-1, 304-2. The times $T_{3a}$ and $T_{3b}$ at which the respective ones of the first intermediate network device 304-1 and the second network device 304-2 begin host-side auto-negotiation differ by amount of time $T_{host\_start\_skew}$ that is sufficiently small such that host-side auto-negotiation is performed by the intermediate network devices 304-1, 304-2 at least substantially simultaneously, in an embodiment.

Figure 3E:
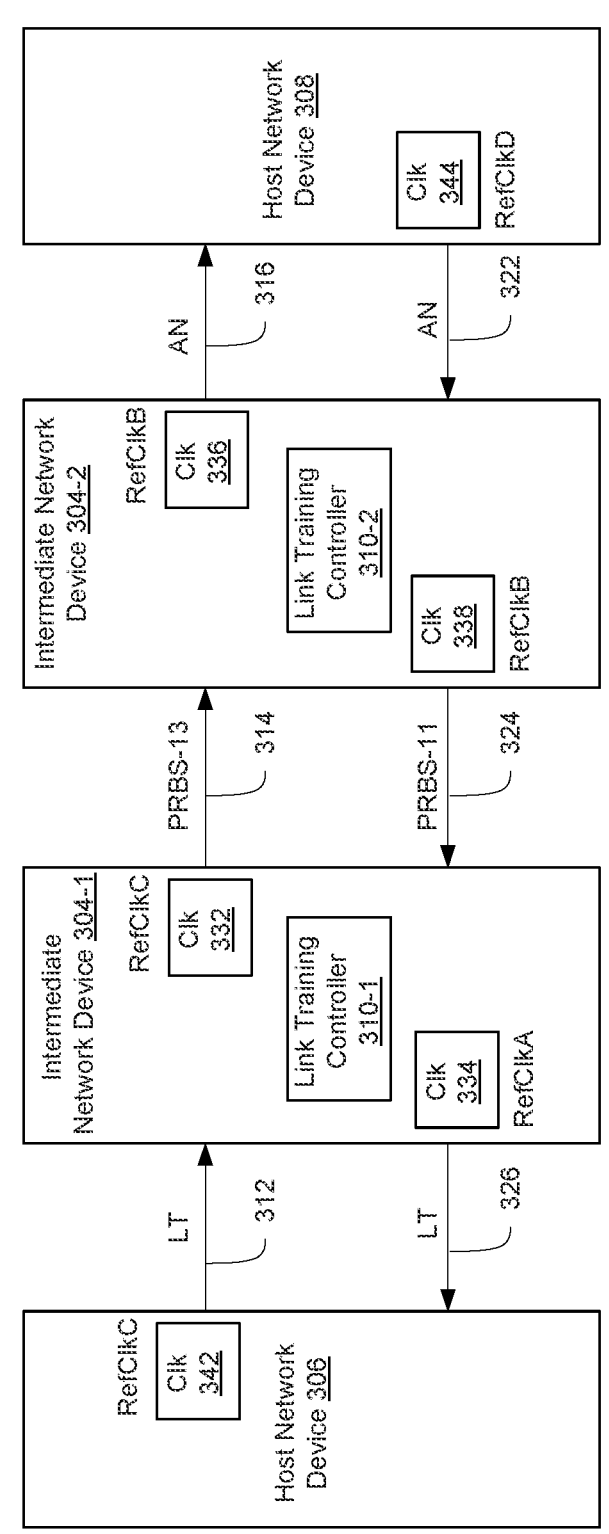

Referring to FIG. 3E, at a time $T_{4a}$ host side auto-negotiation between the first intermediate network device 304-1 and the first host network device 306 is completed. Upon completion of the host side auto-negotiation between the first intermediate network device 304-1 and the first host network device 306, the link training controller 310-1 initiates host side link training between the first intermediate network device 304-1 and the first host network device 306. In an embodiment, during link training between the first intermediate network device 304-1 and the first host network device 306, the first intermediate network device 304-1 adjusts the transmit clock 332 at the first intermediate network device 304-1 to synchronize the transmit clock 330 with the transmit clock 342 (RefClkC) of the first host network device 306. For example, the first intermediate network device 304-1 is configured to adjust the transmit clock 332 based on a clock signal that is embedded in training signals transmitted during link training from the first host network device 306 to the first intermediate network device 304-1. In an embodiment, the first intermediate network device 304-1 is configured to maintain the transmit clock 332 using an FLL or other suitable controller configured to control speed of adjustment of the frequency of a clock, and to slowly adjust the frequency of the transmit clock 332 to ensure that the transmit clock 332 is adjusted sufficiently slowly while the PRBS is being transmitted to the second intermediate network device 304-2 using the transmit clock 332 by the first intermediate network device 304-1, such that the second intermediate network device 304-2 does not lose a lock on the PRBS received from the first intermediate network device 304-1.

In an embodiment, the link training controller 310-1 of the first intermediate network device 304-1 is configured to, when the transmit clock 332 of the first intermediate network device 304-1 is synchronized with the transmit clock 342 of the first host network device 306, signal to the second intermediate network device 304-2 that the transmit clock 332 of the first intermediate network device 304-1 is synchronized with the transmit clock 342 of the first host network device 306. For example, the link training controller 310-1 is configured to switch the PRBS transmitted over the network link 314 to the second intermediate network device 304-2 from the particular first predetermined PRBS (e.g., PRBS-11) to a particular second predetermined PRBS (e.g., PRBS-13) to signal to the second intermediate network device 304-2 that the transmit clock 332 of the first intermediate network device 304-1 is synchronized with the transmit clock 342 of the first host network device 306, in an embodiment. As described in more detail below, the second intermediate network device 304-2 is configured to detect the change of the PRBS transmitted on the network link 314 from the particular first predetermined PRBS (e.g., PRBS-11) to the particular second predetermined PRBS (e.g., PRBS-13), and, in response to detecting the change of the PRBS transmitted on the network link 314 from the particular first predetermined PRBS (e.g., PRBS-11) to the particular second predetermined PRBS (e.g., PRBS-13), begin adjusting the transmit clock 336 of the second intermediate network device 304-2 to the transmit clock 332 (RefClkC) of the first intermediate network device 304-1, in an embodiment.

Figure 3F:
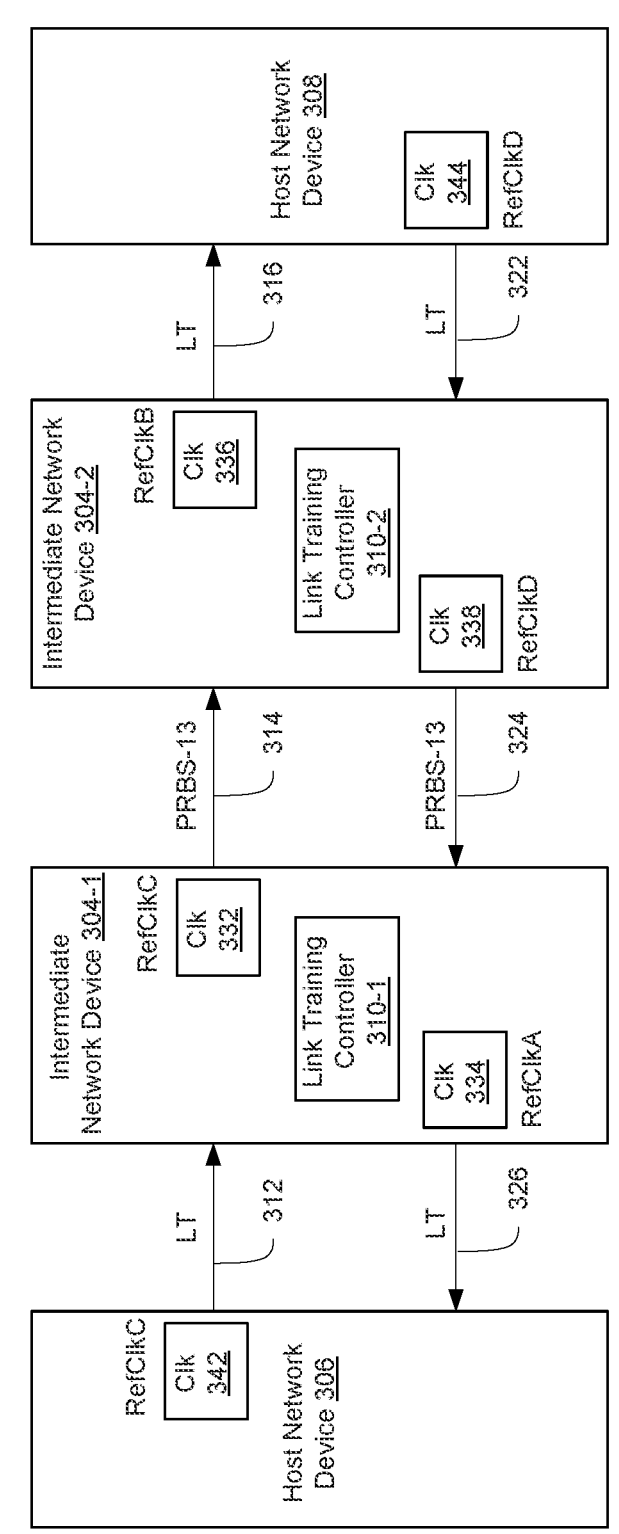

Referring to FIG. 3F, at a time $T_{4b}$, auto-negotiation is completed between the second intermediate network device 304-2 and the second host network device 308. Upon completion of auto-negotiation between the second intermediate network device 304-2 and the second host network device 308, the link training controller 310-2 of the second intermediate network device 304-2 begins link training between the second intermediate network device 304-2 and the second host network device 308. In an embodiment, during link training between the second intermediate network device 304-2 and the second host network device 308, the second intermediate network device 304-2 adjusts the transmit clock 338 at the second intermediate network device 304-2 to synchronize the transmit clock 338 with the transmit clock 344 (RefClkD) of the second host network device 308. For example, the second intermediate network device 304-2 is configured to adjust the transmit clock 338 based on a clock signal that is embedded in training signals transmitted during link training from the second host network device 308 to the second intermediate network device 304-2. In an embodiment, the second intermediate network device 304-2 is configured to maintain the transmit clock 338 using an FLL or other suitable controller configured to control speed of adjustment the frequency of a clock, and to slowly adjust the frequency of the transmit clock 338 to ensure that the transmit clock 338 is adjusted sufficiently slowly while the PRBS is being transmitted from the second intermediate network device 304-2 using the transmit clock 338 by the second intermediate network device 304-2, such that the first intermediate network device 304-1 does not lose a lock on the PRBS received from the second intermediate network device 304-2. In an embodiment, when the transmit clock 338 of the second intermediate network device 304-2 is locked with the transmit clock (RefClkD) of the second host network device 308, the link training controller 310-2 of the second intermediate network device 304-2 signals the lock to the first intermediate network device 304-1. For example, the link training controller 310-2 is configured signal the lock by switching the PRBS transmitted over the network link 324 to the first intermediate network device 304-1 from the particular first predetermined PRBS (e.g., PRBS-11) to a particular second predetermined PRBS (e.g., PRBS-13), in an embodiment. As described in more detail below, the first intermediate network device 304-1 is configured to detect the change of the PRBS transmitted on the network link 324 from the particular first predetermined PRBS (e.g., PRBS-11) to the particular second predetermined PRBS (e.g., PRBS-13), and, in response to detecting the change of the PRBS transmitted on the network link 324 from the particular first predetermined PRBS (e.g., PRBS-11) to the particular second predetermined PRBS (e.g., PRBS-13), begin adjusting the transmit clock 334 of the first intermediate network device 304-1 to the transmit clock 338 (RefClkD) of the second intermediate network device 304-1, in an embodiment.

Figure 3G:
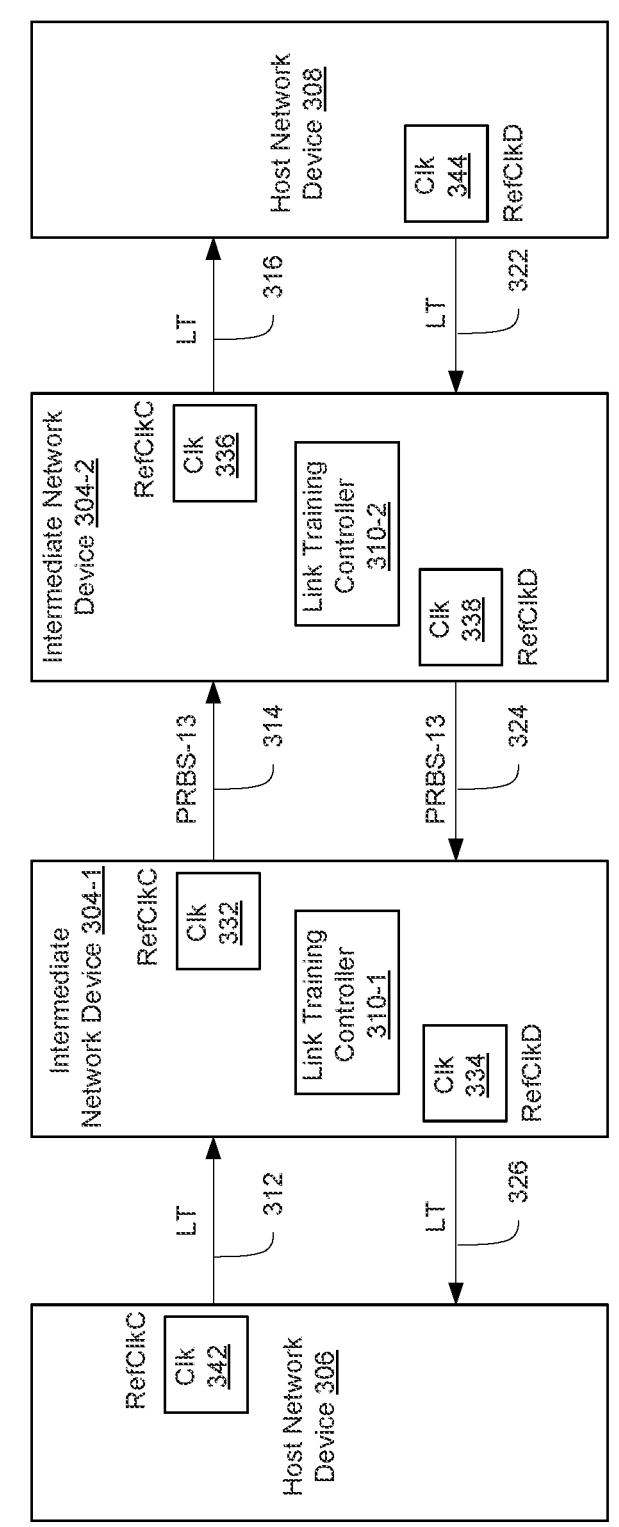

Referring to FIG. 3G, at a time $T_{5a}$, the second intermediate network device 304-2 detects the change of the PRBS transmitted on the network link 314 from the particular first predetermined PRBS (e.g., PRBS-11) to the particular second predetermined PRBS (e.g., PRBS-13), and, in response to detecting the change of the PRBS transmitted on the network link 314 from the particular first predetermined PRBS (e.g., PRBS-11) to the particular second predetermined PRBS (e.g., PRBS-13), begins adjusting the transmit clock 336 of the second intermediate network device 304-2 to the transmit clock 332 of the first intermediate network device 304-1. In an embodiment, the second intermediate network device 304-2 is configured to adjust the transmit clock 336 based on a clock signal that is embedded in PRBS signal transmitted during host side link training from the first intermediate network device 304-1 to the second intermediate network device 304-2. In an embodiment, the second intermediate network device 304-2 is configured to maintain the transmit clock 336 using an FLL or other suitable controller configured to control speed of adjustment of the frequency of a clock, and to slowly adjust the frequency of the transmit clock 336 to ensure that the transmit clock 336 is adjusted sufficiently slowly while the PRBS is being received from the first intermediate network device 304-1, such that the second intermediate network device 304-2 does not lose a lock on the PRBS transmitted by the first intermediate network device 304-1 using the transmit clock 332.

With continued reference to FIG. 3G, at a time $T_{5b}$, the first intermediate network device 304-2 detects the change of the PRBS transmitted on the network link 324 from the particular first predetermined PRBS (e.g., PRBS-11) to the particular second predetermined PRBS (e.g., PRBS-13), and, in response to detecting the change of the PRBS transmitted on the network link 324 from the particular first predetermined PRBS (e.g., PRBS-11) to the particular second predetermined PRBS (e.g., PRBS-13), begins adjusting the transmit clock 334 of the first intermediate network device 304-2 to the transmit clock 338 of the second intermediate network device 304-2. In an embodiment, the first intermediate network device 304-1 is configured to adjust the transmit clock 334 based on a clock signal that is embedded in the PRBS signal transmitted during host side link training from the second intermediate network device 304-2 to the first intermediate network device 304-1. In an embodiment, the first intermediate network device 304-1 is configured to maintain the transmit clock 334 using an FLL or other suitable controller configured to control speed of adjustment of the frequency of a clock, and to slowly adjust the frequency of the transmit click 334 to ensure that the transmit clock 334 is adjusted sufficiently slowly while the PRBS is being received from the second intermediate network device 304-2 such that the first intermediate network device 304-1 does not lose a lock on the PRBS transmitted by the second intermediate network device 304-1 using the transmit clock 338.

Figure 3H:
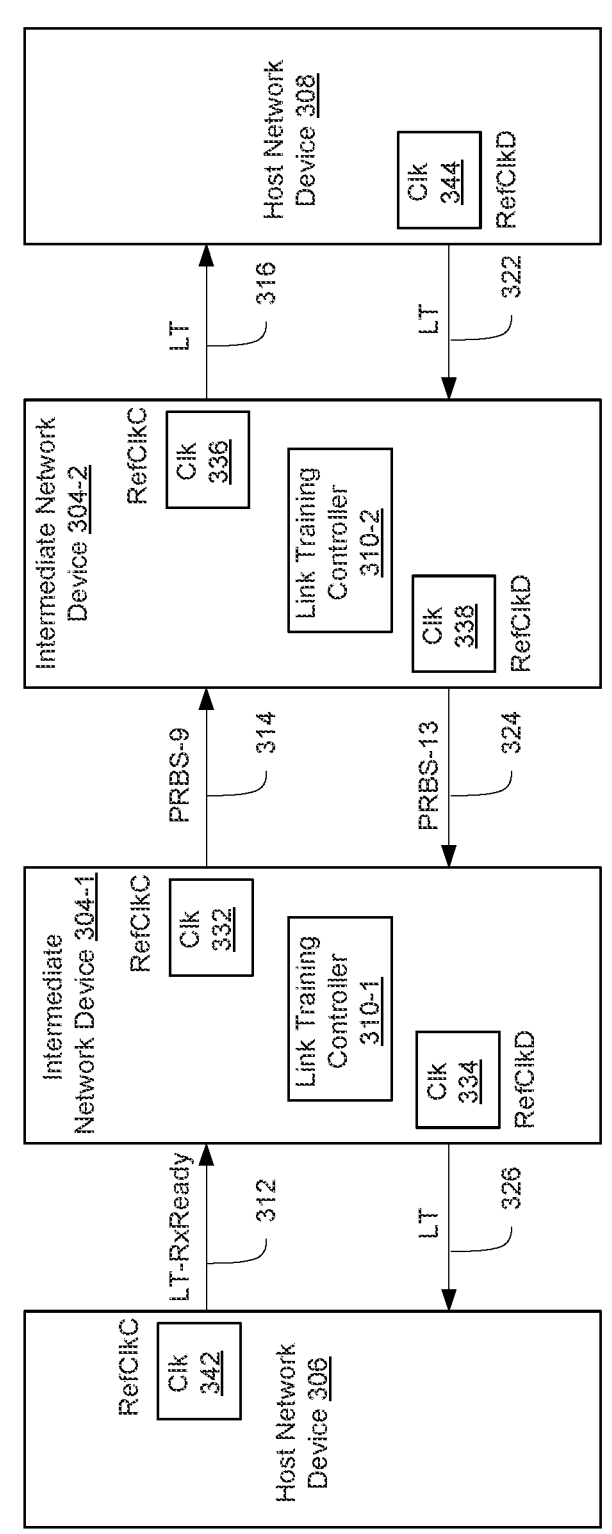

Referring now to FIG. 3H, at a time Toa, the first intermediate network device 304-1 receives, from the first host network device 306, an indication (e.g., an LT-RxReady signal) that link training of the network link 326 has been completed at the first host network device 306. When the indication that link training of the network link 326 has been completed at the first host network device is received from the first host network device and training of the network link 312 is also completed at the first intermediate network device 304-1, the link training controller 310-1 signals, to the second intermediate network device 304-2, that link training has been completed between the first intermediate network device 304-1 and the first host network device 306. For example, the link training controller 310-1 is configured to signal completion of link training by switching the PRBS transmitted over the network link 314 to the second intermediate network device 304-2 from the particular second predetermined PRBS (e.g., PRBS-13) to a particular third predetermined PRBS (e.g., PRBS-9), in an embodiment. At the time $T_{6a}$, the first intermediate network device 304-1 has not yet received an indication from the second intermediate network device 304-2 that link training has been completed between the second intermediate network device 304-2 and the second host network device 308, in an embodiment. Accordingly, the link training controller 310-1 of the first intermediate network device 304-1 delays transmission of a link training completion indication to the first host network device 306, in an embodiment.

Figure 3I:
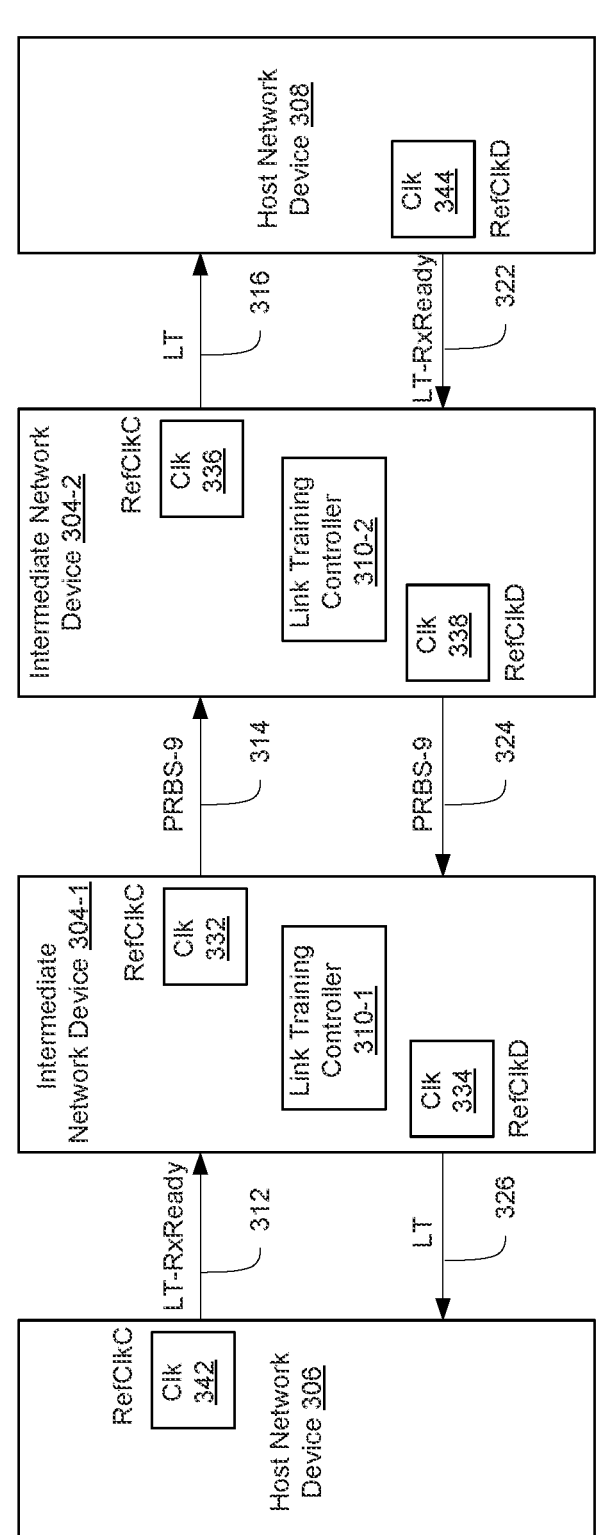

Referring now to FIG. 3I, at a time $T_{6b}$, the second intermediate network device 304-2 receives, from the second host network device 308, an indication (e.g., an LT-RxReady signal) indicating that link training of the network link 316 has been completed at the second host network device 308. When the indication indicating that link training of the network link 316 has been completed at the second host network device 308 is received from the second host network device 308 and training of the network link 322 is completed at the second intermediate network device 304-2, the link training controller 310-2 signals, to the first intermediate network device 304-1, that link training has been completed between the second intermediate network device 304-2 and the second host network device 308. For example, the link training controller 310-2 is configured to signal completion of link training by switching the PRBS transmitted over the network link 324 to the first intermediate network device 304-1 from the particular second predetermined PRBS (e.g., PRBS-13) to the particular third predetermined PRBS (e.g., PRBS-9), in an embodiment. At the time $T_{6b}$, the second intermediate network device 304-2 has not yet received an indication from the first intermediate network device 304-1 that link training has been completed between the first intermediate network device 304-1 and the second host network device 308, in an embodiment. Accordingly, the link training controller 310-2 of the second intermediate network device 304-2 delays transmission of a link training completion indication to the second host network device 308, in an embodiment.

Figure 3J:
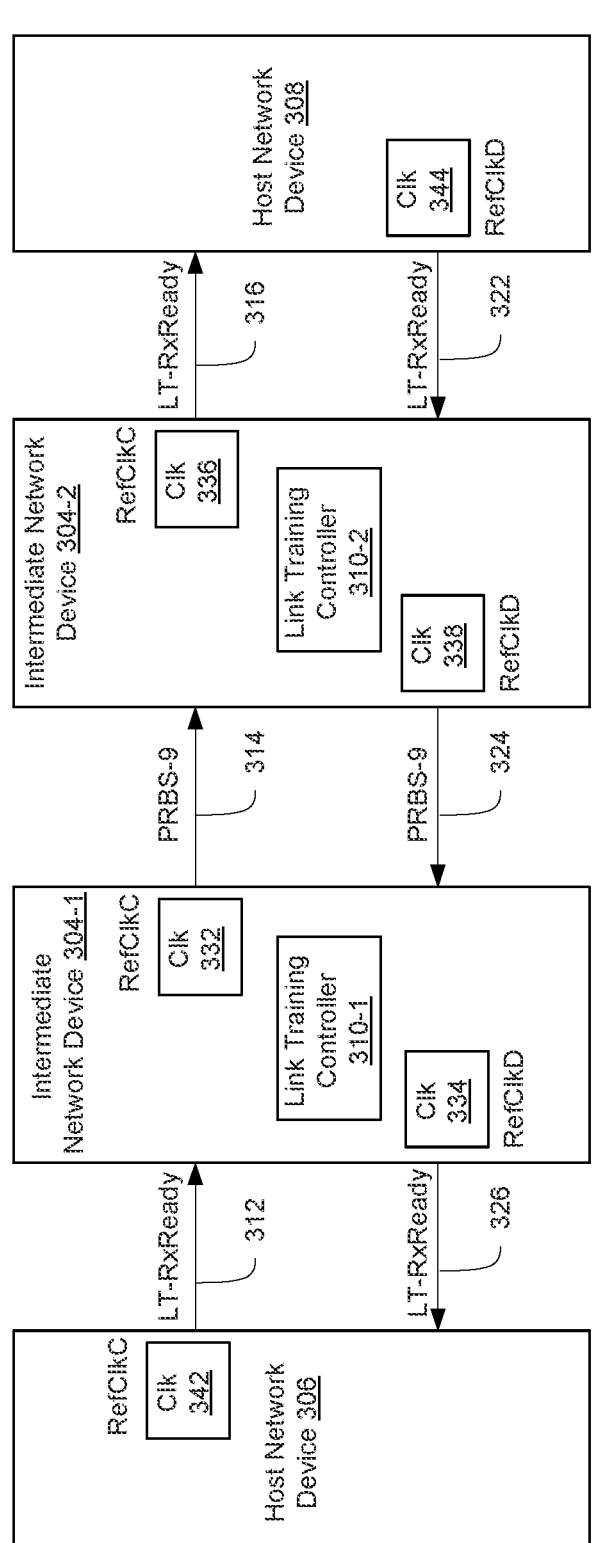
Figure 3K:
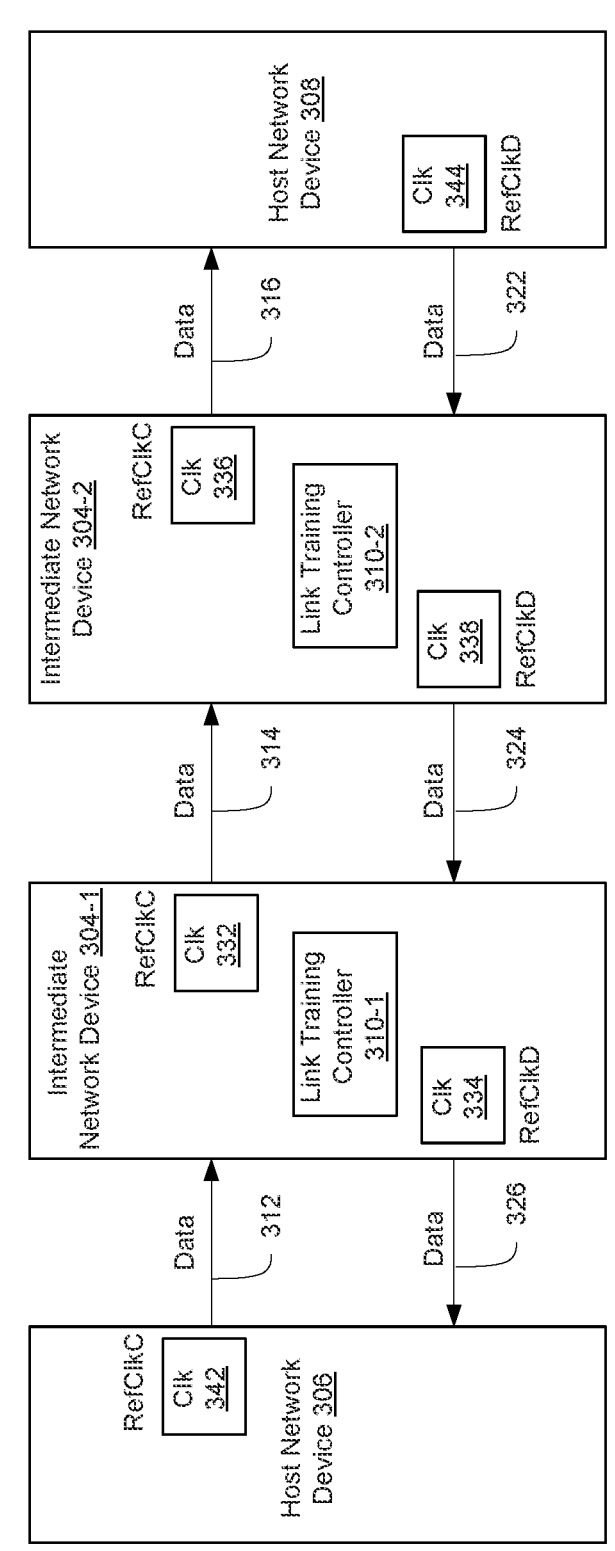

Referring now to FIG. 3J, at a time $T_7$, i) the first intermediate network device 304-1 has determined that link training has been completed between the second intermediate network device 304-2 and the second host network device 308 and ii) the second intermediate network device 304-1 has determined that link training has been completed between the first intermediate network device 304-1 and the first host network device 306. For example, the link training controller 310-1 of the first intermediate network device 304-1 is configured to detect the switch of the PRBS transmitted over the network link 324 from the second intermediate network device 304-2 from the from the particular second predetermined PRBS (e.g., PRBS-13) to the particular third predetermined PRBS (e.g., PRBS-9) to determine that link training has been completed between the second intermediate network device 304-2 and the second host network device 308, in an embodiment. Similarly, the link training controller 310-2 of the second intermediate network device 304-2 is configured to detect the switch of the PRBS transmitted over the network link 314 from the first intermediate network device 304-1 from the from the particular second predetermined PRBS (e.g., PRBS-13) to the particular third predetermined PRBS (e.g., PRBS-9) to determine that link training has been completed between the first intermediate network device 304-1 and the first host network device 306, in an embodiment. Upon determining that link training has been completed between the second intermediate network device 304-2 and the second host network device 308, the link training controller 310-1 of the first intermediate network device 304-1 transmits a link training completion indication (e.g., LT-LT-RxReady signal) to the first host network device 306. Similarly, upon determining that link training has been completed between the first intermediate network device 304-1 and the first host network device 306, the link training controller 310-2 of the second intermediate network device 304-2 transmits a link training completion indication (e.g., LT-RxReady signal) to the second host network device 308. Accordingly, referring now to FIG. 3K, at a time $T_8$, data transmissions occur between the first host network device 306 and the second host network device 308. Because transmission of link training completion indications were delayed until training has been completed between both i) the first intermediate network device 304-1 and the first host network device 306 and ii) the second intermediate network device 304-2 and the second host network device 308, and transmit clocks at the intermediate network devices 304-1, 304-2 have been locked to the transmit clocks at the first host network device 306 and the second host network device 308, data transmissions begin within the certain time after link training completion as stipulated by the communication protocol, such as the IEEE 802-3 standard, in an embodiment.

FIG. 4 is a diagram of an example method 400 for performing link training over a plurality of hops between host network devices, according to an embodiment. In an embodiment, the method 400 is implemented by the first intermediate network device 104-1 and/or the second intermediate network device 104-2 of FIG. 1, and the method 400 is described with reference to FIG. 1 for case of explanation. In other embodiments, the method 400 is implemented by a suitable network device different from the intermediate network devices 104-1, 104-2 of FIG. 1 and/or in a system different from the system 100 of FIG. 1.

At a block 402, a first intermediate network device among one or more intermediate network devices performs link training on a first network link. The first network link extends between the first intermediate network device and a first host network device, in an embodiment. For example, the first intermediate network device 104-1 performs link training on the network link 120 that extends between the first intermediate network device 104-1 and the first host network device 104-2, in an embodiment.

At a block 404 the first intermediate network device or a second intermediate network device among the one or more intermediate network devices performs link training on a second network link. The second network link extends between either the first intermediate network device or the second intermediate network device and a second host network device, in an embodiment. For example, the second intermediate network device 104-2 performs link training on the network link 122 that extends between the second intermediate network device 104-1 and the second host network device 104-2, in an embodiment.

In some embodiments, prior to performing link training on the first network link and the second network link, the one or more intermediate network devices perform auto-negotiation to select a transmission speed to be used for communication over the first network link and the second network link. In some embodiments, in which the one or more intermediate network devices include multiple intermediate network devices, the multiple intermediate network devices perform line-side link training on one or more network links between the intermediate network devices prior to initiating link training on the first network link and the second network link between respective intermediate network devices coupled to respective host network devices. In some embodiments, prior to line-side performing link training between intermediate network devices, the intermediate network devices perform auto-negotiation to select a transmission speed to be used for communication between the intermediate network devices.

At a block 406, the one or more intermediate network devices determine when link training of the first network link and the second network link has been completed. For example, the one or more intermediate network devices determine when link training of the first network link and the second network link has been completed in response to receiving respective link completion indications from the respective host network devices.

At a block 408, the one or more intermediate network devices transmit respective link training completion indications to the first host network device and to the second host network device. In an embodiment, transmitting the respective link indications at block 408 includes delaying transmission of the respective link training completion indications until link training of both the first network link and the second network link has been completed. For example, the first intermediate network device 104-1 delays transmission of a link completion indication to the first host network device 106 until the first intermediate network device 104-1 receives a link training completion indication from the second intermediate network device 104-2 indicating that link training of the network link 122 has been completed between the second intermediate network device 104-2 and the second host network device 108, in an embodiment.

Similarly, the second intermediate network device 104-2 delays transmission of a link completion indication to the second host network device 108 until the second intermediate network device 104-2 receives a link training completion indication from the first intermediate network device 104-1 indicating that link training of the network link 120 has been completed between the first intermediate network device 104-1 and the first host network device 106, in an embodiment.

In some embodiments, link training performed between the one or more intermediate network devices and the host network devices incudes adjusting transmit clocks at the one or more intermediate network devices based on training signals received from the host network devices, or signals received from by an intermediate network device from an upstream intermediate network device, to synchronize transmit clocks at the one or more intermediate network devices with transmit clocks at the host network devices. In at least some such embodiments, transmitting the respective link indications at block 408 includes delaying transmission of the respective link training completion indications until i) link training of both the first network link and the second network link has been completed and ii) transmit clocks of the one or more intermediate network devices have been synchronized with the transmit clocks of the host network devices.

After the respective link training completion indications have been transmitted to the host network devices, data transmissions begin between the host network devices. In various embodiments, because the one or more intermediate network devices delay transmission of the respective link training completion indications until link training of network links respectively coupled to the first host network device and to the second host network device has been completed, the host network devices receive the respective indications at approximately the same time. Thus, data transmission between the host network devices can begin within the period of time stipulated by the current communication standard. Accordingly, delaying transmission of respective link training completion indications until link training of links respectively coupled to the first host network device and to the second host network device has been completed allows for the multi-hop link training to be performed between two host network devices configured in accordance with the current communication standard without changing firmware of the host network devices, in at least some embodiments.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing link training over a plurality of hops between host network devices, the method comprising:

performing, by a first intermediate network device among one or more intermediate network devices, link training on a first network link, the first network link extending between the first intermediate network device and a first host network device;

performing, by a second intermediate network device among the one or more intermediate network devices, link training on a second network link, the second network link between the second intermediate network device and a second host network device;

performing, by the first intermediate network device, link training on a third link between the first intermediate network device and the second intermediate network device prior to i) the first intermediate network device performing link training on the first network link with the first host network device and ii) the second intermediate network device performing link training on the second network link;

determining, by the one or more intermediate network devices, when link training of the first network link and the second network link has been completed; and transmitting, by the one or more intermediate network devices, respective link training completion indications to the first host network device and to the second host network device, including delaying transmission of the respective link training completion indications until link training of both the first network link and the second network link has been completed.

2. The method of claim 1, wherein determining when link training of the first network link has been completed includes receiving, at the one or more intermediate network devices, i) a first indication from the first host network device, the first indication indicating that link training has been completed with the first host network device and ii) a second indication from the second host network device, the second indication indicating that link training has been completed with the second host network device.

3. The method of claim 1, further comprising:

suppressing both i) link training on the first network link with the first host network device and ii) link training on the second network link with the second host network device until link training on the third link is completed.

4. The method of claim 3, further comprising, when link training on the third link has been completed, transmitting respective first predetermined pseudorandom binary sequence (PRBS) signals between the first intermediate network device and the second intermediate network device to maintain a lock between the first intermediate network device and the second intermediate network device, and initiating i) the link training on the first network link, and ii) the link training on the second network link.

5. The method of claim 4, wherein i) the training on the first network link includes synchronizing a first transmit clock at the first intermediate network device with a transmit clock of the first host network device and ii) the link training on the second network link includes synchronizing a first transmit clock at the second intermediate network device with a transmit clock of the second host network device.

6. The method of claim 5, further comprising switching, by the first intermediate network device, transmitting the first predetermined PRBS to the second intermediate network device to transmitting a second predetermined PRBS to the second intermediate network device to signal to the second intermediate network device that the first transmit clock at the first intermediate network device has been synchronized with the transmit clock of the first host network device, and switching, by the second intermediate network device, transmitting the first predetermined PRBS to the first intermediate network device to transmitting the second predetermined PRBS to the first intermediate network device to signal to the first intermediate network device that the first transmit clock at the second intermediate network device has been synchronized with the transmit clock of the second host network device.

7. The method of claim 6, further comprising:

transmitting a first link training completion indication from the first intermediate network device to the second intermediate network device when link training between the first intermediate network device and the first host network device has been completed, and transmitting a second link training completion indication from the second intermediate network device to the first intermediate network device when link training between the second intermediate network device and the second host network device has been completed.

8. The method of claim 7, wherein:

transmitting the first link training completion indication comprises switching, by the first intermediate network device, transmitting the second predetermined PRBS to the second intermediate network device to transmitting a third predetermined PRBS to the second intermediate network device to signal to the second intermediate network device that link training between the first intermediate network device and the first host network device has been completed, and transmitting the second link training completion indication comprises switching, by the second intermediate network device, transmitting the second predetermined PRBS to the first intermediate network device to transmitting the third predetermined PRBS to the first intermediate network device to signal to the first intermediate network device that link training between the second intermediate network device and the second host network device has been completed.

9. A method for performing link training over a plurality of hops between host network devices, the method comprising:

performing, by a first intermediate network device among one or more intermediate network devices, link training on a first network link, the first network link extending between the first intermediate network device and a first host network device, the performing of the link training on the first network link including synchronizing respective one or more first transmit clocks at the one or more intermediate network devices with a transmit clock of the first host network device;

performing, by the first intermediate network device or by a second intermediate network device among the one or more intermediate network devices, link training on a second network link, the second network link extending between i) either the first intermediate network device or the second intermediate network device and ii) a second host network device, the performing of the link training on the second network link including synchronizing respective one or more second transmit clocks at the one or more intermediate network devices with a transmit clock of the second host network device;

transmitting, by the one or more intermediate network devices, respective link training completion indications to the first host network device and the second host network device, including delaying one or more of the respective link training completion indications until both i) the respective one or more first transmit clocks are synchronized with the transmit clock of the first host network device and i) the respective one or more second transmit clocks are synchronized with the transmit clock of the second host network device.

10. An active cable assembly, comprising:

a first intermediate network device having a first interface configured to couple with a first host network device via a first network link that extends between the first intermediate network device and the first host network device, the first intermediate network device including a first link training controller configured to perform link training on the first network link with the first host device;

a second intermediate network device having a second interface configured to couple with a second host network device via a second network link that extends between the second intermediate network device and the second host network device, the second intermediate network device including a second link training controller configured to perform link training on the second network link; and a third network link between the first intermediate network device and second the intermediate network device;

the first link training controller of the first intermediate network device being further configured to:

perform link training on the third network link prior to i) the first link training controller performing link training on the first network link and i) the second link training controller performing link training on the second network link, and determine when link training of the first network link and the second network link has been completed, transmit a first link training completion indication to the first host network device, and delay transmission of the first link training completion indication until link training of both the first network link and the second network link has been completed; and the second link training controller of the second intermediate network device being further configured to:

determine when link training of the first network link and the second network link has been completed, transmit a second link training completion indication to the second host network device; and delay transmission of the second link training completion indication until link training of both the first network link and the second network link has been completed.

11. The active cable assembly of claim 10, wherein the one or more link training controllers are configured to determine when link training of the first network link has been completed in response to receiving i) a first indication from the first host network device, the first indication indicating that link training has been completed with the first host network device and ii) a second indication from the second host network device, the second indication indicating that link training has been completed with the second host network device.

12. The active cable assembly of claim 10, wherein:

the first link training controller is configured to suppress link training on the first network link with the first host network device until link training on the third link is completed, and the second link training controller is configured to suppress link training on the second network link with the second host network device until link training on the third link is completed.

13. The active cable assembly of claim 12, wherein the first link training controller and the second link training controller are further configured to, when link training on the third network link has been completed:

transmit respective first predetermined pseudorandom binary sequence (PRBS) signals between the first intermediate network device and the second intermediate network device to maintain a lock between the first intermediate network device and the second intermediate network device, and initiate i) the link training on the first network link, and ii) the link training on the second network link.

14. The active cable assembly of claim 13, wherein:

the first intermediate network device is configured to, during the link training on the first network link, synchronize a first transmit clock at the first intermediate network device with a transmit clock of the first host network device, the second intermediate network device is configured to, during the link training on the second network link, synchronize a second transmit clock at the second intermediate network device with a transmit clock of the second host network device.

15. The active cable assembly of claim 14, wherein:

the first intermediate network device is further configured to switch transmitting the first predetermined PRBS to the second intermediate network device, to transmitting a second predetermined PRBS to the second intermediate network device to signal to the second intermediate network device that the first transmit clock at the first intermediate network device has been synchronized with the transmit clock of the first host network device, and the second intermediate network device is further configured to switch transmitting the first predetermined PRBS to the first intermediate network device to transmitting the second predetermined PRBS to the first intermediate network device to signal to the first intermediate network device that the first transmit clock at the second intermediate network device has been synchronized with the transmit clock of the second host network device.

16. The active cable assembly of claim 15, wherein:

the first link training controller of the first intermediate network device is further configured to transmit a first link training completion indication to the second intermediate network device when link training between the first intermediate network device and the first host network device has been completed, and the second link training controller of the second intermediate network device is further configured to transmit a second link training completion to the first intermediate network device when link training between the second intermediate network device and the second host network device has been completed.

17. The active cable assembly of claim 16, wherein:

the first link training controller of the first intermediate network device is configured to switch transmitting the second predetermined PRBS to the second intermediate network device to transmitting a third predetermined PRBS to the second intermediate network device to signal to the second intermediate network device that link training between the first intermediate network device and the first host network device has been completed, and the second link training controller of the second intermediate network device is configured to switch transmitting the second predetermined PRBS to the second intermediate network device to transmitting the third predetermined PRBS to the first intermediate network device to signal to the first intermediate network device that link training between the second intermediate network device and the second host network device has been completed.

18. An active cable assembly, comprising:

one or more intermediate network devices, wherein a respective intermediate network device among the one or more intermediate network devices includes i) a first interface configured to couple with a first host network device directly or via one or more upstream intermediate network devices and i) a second interface configured to couple with a second host network device directly or via one or more downstream intermediate network devices; and one or more link training controllers implemented by the one or more intermediate network devices, the one or more link training controllers configured to:

perform link training on a first network link, the first network link extending between a first intermediate network device and a first host network device, during link training on the first network link, synchronize respective one or more first transmit clocks at the one or more intermediate network devices with a transmit clock of the first host network device, perform link training on a second network link, the second network link extending between i) either the first intermediate network device or a second intermediate network device and ii) a second host network device, during link training on the second network link, synchronize respective one or more second transmit clocks at the one or more intermediate network devices with a transmit clock of the second host network device, determine when link training of the first network link and the second network link has been completed, transmit respective link training completion indications to the first host network device and to the second host network device, and delay one or more of the respective link training completion indications until both i) the respective one or more first transmit clocks are synchronized with the transmit clock of the first host network device and i) the respective one or more second transmit clocks are synchronized with the transmit clock of the second host network device.

* * * * *